UNITED STATES PATENT OFFICE.

HERMANN HEIMANN, OF COLOGNE, GERMANY.

COMPOSITION FOR PREVENTING INCRUSTATION OF BOILERS.

SPECIFICATION forming part of Letters Patent No. 235,633, dated December 21, 1880.

Application filed April 10, 1880. (No specimens.)

*To all whom it may concern:*

Be it known that I, HERMANN HEIMANN, of Cologne, in the German Empire, have invented a new and useful Means for Preventing the Incrustation of Boilers, which is fully set forth and described in the following specification.

My invention relates to the means of preventing the incrustation of boilers; and it consists in adding to the feed-water, when it is already in the boiler, roasted and ground coffee-beans (seed of the *Coffea Arabica*, L.) in quantities depending upon the nature and quantity of solid substances dissolved in the feed-water. The effect of this addition is to coat the inside of the boiler-plates with a fatty substance, which prevents the adhesion of stone. Besides this, the chemical compounds or products of decomposition formed by roasting the coffee-beans, and about whose constitution we have at present no reliable information, cause the solid substances, dissolved in the boiler-water, to be precipitated in the shape of powder or mud.

I claim—

The application of roasted and ground coffee-beans for preventing the incrustation of boilers, substantially as described.

In testimony whereof I have signed this specification in the presence of two subscribing witnesses.

HERMANN HEIMANN.

Witnesses:
G. ADOLF HART,
FRIEDRICH SAPE.